3,097,233
UNSATURATED ESTER PURIFICATION
Edward P. Maglaughlin and Robert E. Trampe, Pampa, Tex., assignors to Celanese Corporation of America, New York, N.Y., a corporation of Delaware
No Drawing. Filed Oct. 8, 1959, Ser. No. 845,092
17 Claims. (Cl. 260—486)

This invention relates to a method of purifying crude unsaturated esters. More particularly, this invention deals with the removal of carbonyl impurities such as biacetyl and other diketones from unsaturated esters, particularly from esters of acrylic acid and the lower alcohols.

One method for making acrylic acid esters utilizes the reaction of beta-propiolactone (in either its monomeric or polymeric form, or mixture of monomer and polymer) with an alcohol. This reaction may be illustrated as follows:

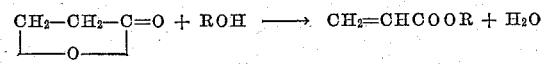

where R is a lower alkyl group, e.g. having from 1 to 8 carbon atoms, such as methyl or ethyl.

The carrying out of the above reaction results, however, in a complex mixture of products. In addition to the desired acrylate ester there are also obtained significant amounts of side reaction products as well as impurities ordinarily present in the feed stock. For example, the reaction of methyl alcohol with beta-propiolactone results in a mixture of products including the desired methyl acrylate, carbonyl impurities such as biacetyl, and other side reaction products and feed contaminants such as acrylic acid, methyl alcohol, and water.

The presence of carbonyl impurities, particularly vic-diketones such as biacetyl, is very undesirable. Biacetyl is a high color compound and its presence even in comparatively minute amounts e.g. 10 p.p.m., causes the crude ester mixture to have a yellowish color. Since monomeric esters such as methyl acrylate and ethyl acrylate are used in the formation of polymeric materials, it is desirable that such monomers be used in their natural colorless state, in order to obtain high quality polymers. This requires the removal of the biacetyl and other high color carbonyl compounds.

The usual distillation techniques for separation of the carbonyl impurities from the ester are not very satisfactory. For example, when dealing with a mixture of methyl acrylate and biacetyl, distillation to remove all of the small amount of biacetyl is difficult because the ester and the biacetyl have very similar boiling point ranges. Moreover, when distillation is attempted, an undesirable degree of polymerization of the unsaturated monomer tends to take place.

Acrylate esters may also be prepared, for example, by direct esterification of the desired acid with the desired alcohol. Regardless of which of the above processes is used, however, the resulting ester mixture may contain yellowish carbonyl impurities which must be removed.

One object is to provide a simple method for removing carbonyl impurities such as biacetyl from a mixture containing an unsaturated ester.

A further object is to provide a method for separating such monomeric esters from carbonyl impurities without causing appreciable polymerization of the ester monomer.

In accordance with one aspect of the invention, the crude mixture containing the unsaturated monomeric ester, carbonyl impurity such as biacetyl, and other side reaction products and impurities is treated with ammonia or an ammonium compound.

One suitable group of ammonium compounds includes ammonium hydroxide, and ammonium salts, e.g. ammonium chloride, ammonium sulfate, ammonium nitrate, ammonium acetate.

The treatment of the crude mixture containing the desired unsaturated ester and biacetyl impurity with the ammonia or ammonium compound results in the formation of a biacetyl complex. This complex has a considerably higher boiling point range than that of the unsaturated ester, so that it can readily be separated therefrom, as by distillation without undue polymerization of the ester monomer. The purified and substantially colorless unsaturated ester is collected in the distillate.

If the ammonium compound is supplied in a form immiscible with the crude mixture, e.g. as an aqueous solution of ammonium hydroxide or an ammonium salt, the ammonium compound solution may be introduced into the top of an extractor, while the crude mixture is introduced at the bottom of the extractor. The liquid solution of the ammonium compound passes downward through the extractor, counter to the upflow of the crude mixture containing unsaturated ester and carbonyl impurities. The ammonium compound thereby reacts with the carbonyl impurities to form the high-boiling complex. Subsequent distillation separates the complex from the more volatile ester. The extraction also serves to remove water-soluble materials such as methanol and acrylic acid from the crude mixture.

If it is desired to treat the crude mixture with ammonia gas, this may be done conveniently by introducing the gas into the lower section of a distillation column, which is generally used to separate the more volatile constituents (such as water and the alcohol used to make the ester) from the desired unsaturated ester. The gas moves upward through the column, contacting the downwardly flowing crude product mixture directly, thereby reacting with carbonyl impurities, e.g. biacetyl, to form the carbonyl ammonia complex, which is subsequently separated from the ester by distillation.

It will be understood that this invention lends itself to the use of either a continuous or batch process.

Where an aqueous solution of an ammonium compound is used, a preferred concentration is about 0.1 to 1.0% by weight at pH in the range of about 7 to 12. The ratio of phase containing the ammonium compound to crude mixture phase may be varied within wide limits, one suitable range of ratios of water phase to organic phase is about 0.5:1 to 3:1. One suitable range of temperatures for the formation of the complex is about 20 to 100° C.

The following examples will further illustrate our invention. All parts are by weight unless otherwise indicated.

*Example 1*

The crude reaction product of beta-propiolactone and methyl alcohol was fed into the bottom of a glass extractor column. This reaction product contained about 70% methyl acrylate and 10% water, as well as some methyl alcohol, acrylic acid and other impurities, including a small amount of biacetyl and 1000 p.p.m. of hydroquinone which served as an inhibitor; the mixture was free of ash. The column was 24 cm. high and 2 cm. in diameter, and was packed with ⅛ inch glass helices. The flow rate of this organic phase was 5 ml. per minute. A 0.9 percent solution of ammonia in water was fed into the top of the extractor at approximately the same flow rate as that of the organic phase. The pH of the aqueous phase was 11.2 and the temperature was 25° C. The water-organic ratio was maintained at 1:1. The organic phase was removed from the top of the extractor column and fed to the midpoint of a distilling column where light ends including water and methyl alcohol, together with a small amount of the methyl acrylate, were removed overhead. The residue from this column was then fed to a second distillation column, from which purified methyl acrylate was taken off overhead at a temperature of 70° C. while the less volatile biacetyl-ammonia complex remained in the residue. Colormetric determinations of the distillate indicated an APHA color of less than 5, showing virtually complete absence of biacetyl in the colorless distillate.

The invention finds its greatest utility for the treatment of mixtures containing at least about 35%, and preferably about 50 to 90%, of the unsaturated ester, contaminated with less than about 0.1%, e.g. about 0.01% to 0.1% of the carbonyl impurity. Usually the difference in the boiling points of the unsaturated ester and the major carbonyl-containing impurity is less than about 15° C., e.g. about 5 to 10° C.

While the invention has been described more particularly for treatment of methyl acrylate, it may also be used for treatment of other acrylate esters, such as ethyl acrylate or other acrylate, e.g. acrylates of alcohols containing up to 8 carbon atoms, and the corresponding methacrylates to remove those carbonyl impurities which are not readily removed by distillation.

It is to be understood that the foregoing detailed description is merely given by way of illustration and that many variations may be made therein without departing from the spirit of our invention.

Having described our invention, what we desire to secure by Letters Patent is:

1. The process of removing ketone impurities from a crude mixture containing an unsaturated monomeric acrylic ester and ketone impurities, said process comprising treating the mixture with a member of the group consisting of ammonia and ammonium compounds capable of forming a carbonyl complex having a substantially higher boiling point than that of the unsaturated ester to form said complex, and separating from the resulting mixture a purified unsaturated ester monomer.

2. The process of removing ketone impurities from a crude mixture containing an unsaturated monomeric acrylic ester and ketone impurities, said process comprising treating the mixture with a member of the group consisting of ammonia and ammonium compounds capable of forming a carbonyl complex having a substantially higher boiling point than that of the unsaturated ester to form said complex, distilling the thus treated mixture, and collecting a purified unsaturated ester monomer in the distillate.

3. The process of claim 2 wherein the ketone impurities comprise a vic-diketone.

4. The process of claim 2 wherein the ketone impurities comprise biacetyl.

5. The process of claim 1 wherein the unsaturated ester is selected from the group consisting of methyl acrylate, ethyl acrylate, methyl methacrylate and ethyl methacrylate.

6. The process of claim 2 wherein the ammonium compound is selected from the group consisting of ammonium hydroxide and ammonium salts.

7. The process of removing biacetyl from a crude mixture comprising an ester monomer selected from the group consisting of methyl acrylate, ethyl acrylate, methyl methacrylate and ethyl methacrylate, this process comprising treating the crude mixture with an ammonium compound selected from the group consisting of ammonium hydroxide and ammonium salts, capable of forming a high-boiling biacetyl complex, distilling the thus treated mixture, and collecting the biacetyl-free ester monomer in substantially colorless form in the distillate.

8. Thes process of claim 7 where the ester is methyl acrylate.

9. The process of claim 8 where the ammonium compound is ammonium hydroxide.

10. The process of claim 8 where the ammonium compound is an ammonium salt.

11. The process of removing ketone impurities from the crude reaction product mixture obtained by the reaction of beta-propiolactone and a lower saturated aliphatic alcohol, said mixture containing at least 35% of a lower acrylate ester monomer and ketone impurities, comprising treating the mixture with an ammonium compound capable of forming a carbonyl-complex compound having a substantially higher boiling point than the acrylate ester to form said complex, distilling the thus treated mixture, and collecting the ketone-free acrylate monomer in substantially colorless form in the distillate.

12. The process of claim 11 wherein the ketone impurities comprise vic-diketones.

13. The process of claim 11 wherein the ketone impurities comprise biacetyl.

14. The process of claim 11 wherein the ammonium compound is selected from the group consisting of ammonium hydroxide and ammonium salts.

15. The process of removing ketone impurities from the crude reaction product mixture obtained by the reaction of beta-propiolactone and a lower saturated aliphatic alcohol, said mixture containing at least 35% of a lower acrylate ester monomer and ketone impurities, comprising treating the mixture with an aqueous ammonia solution to thereby form a complex carbonyl-ammonia compound having a substantially higher boiling point than the acrylate ester, separating the aqueous solution phase from the crude mixture phase, distilling the thus treated crude mixture phase, and collecting the carbonyl-free acrylate monomer in substantially colorless form in the distillate.

16. The process of claim 15 where the ketone impurities comprise a vic-diketone.

17. The process of claim 15 wherein the ketone impurities comprise biacetyl.

References Cited in the file of this patent

UNITED STATES PATENTS

| | | |
|---|---|---|
| 1,963,968 | Burke et al. | June 26, 1934 |
| 2,466,501 | Steadman et al. | Apr. 4, 1949 |
| 2,500,005 | Norris | Mar. 7, 1950 |
| 2,510,423 | Shaver | June 6, 1950 |
| 2,618,652 | Hollyday | Nov. 18, 1952 |

OTHER REFERENCES

Haslam et al., J. Appl. Chem. (London) 7, 24–32 (1957).

Rodd, "Chemistry of Carbon Compounds," Vol. 1A, 1951, pp. 469 and 533–535.